(12) United States Patent
Carlson et al.

(10) Patent No.: US 8,945,643 B2
(45) Date of Patent: Feb. 3, 2015

(54) SYSTEM AND METHOD FOR FORMING A MULTI-LAYER EXTRUDED FOOD PRODUCT

(75) Inventors: Joshua S. Carlson, Glen Ellyn, IL (US); Yelena Y. Pinkevich, Carol Stream, IL (US); Barbara K. Schmitt, Downers Grove, IL (US); Dejing Fu, Lisle, IL (US); Glenn Wille, Oswego, IL (US)

(73) Assignee: The Hillshire Brands, Company, Chicago, IL (US)

( * ) Notice: Subject to any disclaimer, the term of this patent is extended or adjusted under 35 U.S.C. 154(b) by 239 days.

(21) Appl. No.: 12/544,857

(22) Filed: Aug. 20, 2009

(65) Prior Publication Data

US 2010/0047400 A1    Feb. 25, 2010

Related U.S. Application Data

(60) Provisional application No. 61/090,778, filed on Aug. 21, 2008.

(51) Int. Cl.
*A23L 1/31* (2006.01)
*A23L 1/00* (2006.01)
*A23L 1/0562* (2006.01)
*A23L 1/317* (2006.01)

(52) U.S. Cl.
CPC ........... *A23L 1/0079* (2013.01); *A23L 1/05625* (2013.01); *A23L 1/3172* (2013.01); *A23L 1/3177* (2013.01)
USPC ............................................ 426/92; 426/105

(58) Field of Classification Search
USPC ......................................... 426/105, 246, 574
See application file for complete search history.

(56) References Cited

U.S. PATENT DOCUMENTS

| | | |
|---|---|---|
| 807,863 A | 1/1959 | Jones |
| 3,306,754 A | 2/1967 | Kielsmeier et al. |
| 3,399,423 A | 9/1968 | Kielsmeier et al. |
| 3,511,669 A | 5/1970 | Swartz et al. |
| 3,563,764 A | 2/1971 | Posegate |
| 1,232,801 A | 5/1971 | Taylor et al. |
| 3,622,353 A | 11/1971 | Bradshaw et al. |
| 1,288,111 A | 9/1972 | Deacon et al. |
| 3,739,427 A | 6/1973 | Niedecker |
| 3,751,202 A | 8/1973 | Coleman et al. |
| 3,752,618 A | 8/1973 | Moreland |
| 3,767,821 A | 10/1973 | Deacon et al. |
| RE28,281 E | 12/1974 | Bridgeford |
| 4,309,450 A | 1/1982 | Seibert |
| 4,377,606 A | 3/1983 | Chiu |
| 4,404,229 A | 9/1983 | Treharne |
| 4,442,868 A | 4/1984 | Smith et al. |
| 4,469,475 A | 9/1984 | Krysiak |
| 4,504,500 A | 3/1985 | Schneck et al. |
| 4,505,939 A | 3/1985 | Chiu |
| 4,539,210 A * | 9/1985 | O'Connell et al. ............. 426/56 |
| 4,569,101 A | 2/1986 | Tribbett |
| 4,609,559 A | 9/1986 | Nicholson |
| 4,659,580 A | 4/1987 | Svengren |
| 4,715,803 A * | 12/1987 | Koppa ....................... 425/133.1 |
| 4,731,906 A | 3/1988 | Matthews et al. |
| 4,748,031 A | 5/1988 | Koppa |
| 4,828,780 A | 5/1989 | Luker |
| 4,834,999 A | 5/1989 | Matthews et al. |
| 4,853,236 A | 8/1989 | Langler |
| 4,861,603 A | 8/1989 | Saito et al. |
| 4,867,204 A | 9/1989 | Ellis et al. |
| 4,905,348 A | 3/1990 | Powers et al. |
| 4,905,587 A | 3/1990 | Smithers |
| 4,921,714 A | 5/1990 | Matthews et al. |
| 4,949,430 A | 8/1990 | Stanek |
| 4,954,061 A | 9/1990 | Repholz et al. |
| 4,958,412 A | 9/1990 | Stanek |
| 5,030,464 A | 7/1991 | Hansen et al. |
| 5,238,442 A | 8/1993 | Townsend |
| 5,270,067 A | 12/1993 | Underwood et al. |
| 5,271,948 A | 12/1993 | Boni et al. |
| 5,277,857 A | 1/1994 | Nicholson et al. |
| 5,417,992 A | 5/1995 | Rizvi et al. |
| 5,437,879 A | 8/1995 | Kabse et al. |
| 5,484,001 A | 1/1996 | Gray |

(Continued)

FOREIGN PATENT DOCUMENTS

| | | |
|---|---|---|
| EP | 0 247 90 | 9/1982 |
| EP | 0 258 037 | 3/1988 |

(Continued)

OTHER PUBLICATIONS

Images of food products believed to have been commercially available before the priority date of the application, 2 pages.

(Continued)

*Primary Examiner* — Humera Sheikh
*Assistant Examiner* — Bhaskar Mukhopadhyay
(74) *Attorney, Agent, or Firm* — Duane Morris LLP

(57) ABSTRACT

Food products and the processes for forming/manufacturing the food products are disclosed. An exemplary food product comprises one or more extruded components (e.g., vegetable, fruit, dairy, meat, flavoring, spice, coloring, particulate, or combinations thereof); and one or more extruded collagen layers substantially encasing the extruded component(s). Another exemplary food product is disclosed as comprising an extruded component; and a carrier co-extruded with the first extruded component, the carrier comprising a matrix adhered to the first extruded component and an additive suspended in the matrix.

33 Claims, 13 Drawing Sheets

(56) References Cited

U.S. PATENT DOCUMENTS

| | | | |
|---|---|---|---|
| 5,492,706 A | 2/1996 | Cockings et al. | |
| 5,514,400 A | 5/1996 | Gray | |
| 5,518,036 A | 5/1996 | DeMasters et al. | |
| 5,549,943 A | 8/1996 | Vicik | |
| 5,554,401 A | 9/1996 | Alexander et al. | |
| 5,573,455 A | 11/1996 | Barilli | |
| 5,599,570 A | 2/1997 | Stribling | |
| 5,686,128 A | 11/1997 | Tracy et al. | |
| 5,705,214 A | 1/1998 | Ito et al. | |
| 5,716,656 A | 2/1998 | Stribling | |
| 5,731,022 A | 3/1998 | Cummins | |
| 5,747,124 A | 5/1998 | Pophusen et al. | |
| 5,795,605 A | 8/1998 | Morgan et al. | |
| 5,882,711 A | 3/1999 | Onoguchi et al. | |
| 5,888,131 A | 3/1999 | Kobussen et al. | |
| 5,928,705 A | 7/1999 | Matthews et al. | |
| 5,951,390 A | 9/1999 | Kobussen et al. | |
| 5,992,345 A | 11/1999 | Lange et al. | |
| 5,993,868 A | 11/1999 | Townsend | |
| 6,042,466 A | 3/2000 | Matthew et al. | |
| 6,059,646 A | 5/2000 | Bindels et al. | |
| 6,089,845 A | 7/2000 | Morgan et al. | |
| 6,103,269 A * | 8/2000 | Wunderlich et al. | 424/489 |
| 6,183,799 B1 | 2/2001 | Wu et al. | |
| 6,251,452 B1 | 6/2001 | Weinstein et al. | |
| 6,331,104 B1 | 12/2001 | Kobussen et al. | |
| 6,379,733 B2 * | 4/2002 | Matthews et al. | 426/516 |
| 6,419,968 B1 * | 7/2002 | Wang et al. | 426/277 |
| 6,426,089 B1 | 7/2002 | Sunohara et al. | |
| 6,428,830 B1 | 8/2002 | Matthews et al. | |
| 6,440,473 B2 | 8/2002 | Geromini et al. | |
| 6,613,372 B1 | 9/2003 | Schlebusch et al. | |
| 6,623,773 B2 | 9/2003 | Meier et al. | |
| 6,660,315 B2 | 12/2003 | Miller et al. | |
| 6,667,082 B2 | 12/2003 | Bamore et al. | |
| 6,805,890 B2 | 10/2004 | Wu et al. | |
| 6,817,850 B2 | 11/2004 | Kobayashi et al. | |
| 6,827,957 B2 | 12/2004 | Paluch et al. | |
| 7,001,547 B2 | 2/2006 | Rasmussen | |
| 7,001,635 B2 | 2/2006 | Merritt, II et al. | |
| 7,011,858 B2 | 3/2006 | Grolig et al. | |
| 7,022,357 B2 | 4/2006 | Krallmann et al. | |
| 7,156,635 B2 | 1/2007 | Matson et al. | |
| 7,172,783 B2 | 2/2007 | Murray et al. | |
| 7,244,171 B2 | 7/2007 | Müller et al. | |
| 7,252,847 B2 | 8/2007 | Keller et al. | |
| 7,264,836 B2 | 9/2007 | McHugh et al. | |
| RE39,943 E | 12/2007 | Kobussen et al. | |
| 7,306,449 B2 | 12/2007 | Huang | |
| 7,306,511 B2 | 12/2007 | Whittlesey et al. | |
| 7,337,708 B2 | 3/2008 | Rothamel et al. | |
| 7,754,258 B2 | 7/2010 | Morgan et al. | |
| 7,906,623 B2 | 3/2011 | Norwood et al. | |
| 2002/0058102 A1 | 5/2002 | Makela et al. | |
| 2003/0031765 A1 | 2/2003 | Luthra et al. | |
| 2004/0219264 A1 | 11/2004 | Schafer | |
| 2005/0031741 A1 | 2/2005 | Morgan et al. | |
| 2005/0126403 A1 | 6/2005 | Arias Lopez | |
| 2005/0129813 A1 | 6/2005 | Koenig et al. | |
| 2005/0220946 A1 | 10/2005 | Torcatis | |
| 2006/0057258 A1 | 3/2006 | Dinh-Sybeldon et al. | |
| 2006/0073245 A1 | 4/2006 | Hammer et al. | |
| 2006/0127538 A1 | 6/2006 | Appleby | |
| 2006/0188615 A1 | 8/2006 | Wilfer et al. | |
| 2006/0233985 A1 | 10/2006 | Pockat et al. | |
| 2006/0240207 A1 | 10/2006 | Tobben et al. | |
| 2007/0031542 A1 * | 2/2007 | Chu et al. | 426/93 |
| 2007/0123839 A1 * | 5/2007 | Rousseau et al. | 604/509 |
| 2007/0190210 A1 | 8/2007 | Koenig et al. | |
| 2008/0003336 A1 | 1/2008 | Schafer | |
| 2008/0003338 A1 | 1/2008 | Barnvos et al. | |
| 2008/0018013 A1 | 1/2008 | Mori et al. | |
| 2008/0182035 A1 | 7/2008 | Samuels | |
| 2008/0226853 A1 | 9/2008 | Bueker et al. | |
| 2009/0155430 A1 | 6/2009 | Lee et al. | |
| 2009/0226557 A1 * | 9/2009 | Etayo Garralda et al. | 426/1 |
| 2010/0129505 A1 | 5/2010 | Hayes et al. | |
| 2011/0142994 A1 * | 6/2011 | Buwalda et al. | 426/62 |

FOREIGN PATENT DOCUMENTS

| | | |
|---|---|---|
| EP | 0 580 232 | 1/1994 |
| EP | 0 720 816 | 7/1996 |
| EP | 0 741 973 | 11/1996 |
| JP | 63-022167 | 1/1988 |
| JP | 01-117759 | 5/1989 |
| WO | WO-93/12660 | 7/1993 |

OTHER PUBLICATIONS

Townsend Further Processing, "QX System" brochure, copyright date of 2010, 12 pages.

\* cited by examiner

SYSTEM AND METHOD FOR FORMING A MULTI-LAYER EXTRUDED FOOD PRODUCT

CROSS REFERENCE TO RELATED APPLICATION

The present application claims priority under 35 U.S.C. §119 from U.S. Provisional Patent Application No. 61/090,778 titled "SYSTEM AND METHOD FOR FORMING CO-EXTRUDED FOOD PRODUCT" filed Aug. 21, 2008, the full disclosure of which is hereby incorporated herein by reference.

BACKGROUND

The present invention relates generally to the field of forming a food product having a first food component (e.g., meat, soy, other protein, etc.), a second food component or additive (e.g., vegetable, fruit, dairy, meat, flavoring, spice, coloring, particulate, aroma, combinations thereof, etc.), and one or more encapsulating layers (e.g., collagen, starch, gums, alginate, cellulose fiber, gelatin, thermo-reversible gel, etc.).

It is known to apply seasoning by hand or with pre-seasoned casings. Another method is to use a dual horn stuffing system that applies the pre-seasoned film at the same time of stuffing.

SUMMARY OF THE INVENTION

One embodiment relates to a food product comprising a first extruded component; a second extruded component co-extruded adjacent the first component; and a first extruded collagen layer substantially encasing the first extruded component and the second extruded component. The second extruded component comprises a vegetable, fruit, dairy, meat, flavoring, spice, coloring, particulate, or combinations thereof.

Another embodiment relates to a food product comprising a first extruded component; a first collagen layer substantially surrounding the first extruded component; and a second collagen layer substantially surrounding the first extruded component and the first collagen layer. The first collagen layer comprises a first additive, and the second collagen layer comprises a second additive.

Another embodiment relates to a process for making a food product comprising extruding a first food component; co-extruding a second food component adjacent the first food component; and co-extruding a first collagen layer substantially surrounding the first food component and the second food component to form a casing.

Another embodiment relates to a process for making a food product comprising providing a first collagen gel having a first additive; providing a second collagen gel having a second additive; and co-extruding a first component, the first collagen gel, and the second collagen gel. The first collagen gel forms an inner casing substantially surrounding the meat component, and the second collagen gel forms an outer casing substantially surrounding the meat component and the first collagen gel.

Another embodiment relates to a food product comprising a first component; and a carrier co-extruded with the first extruded component, the carrier comprising a matrix adhered to the first component and an additive suspended in the matrix.

Another embodiment relates to a process for making a food product comprising providing a first food component to a co-extrusion system; providing a carrier to a co-extrusion system; extruding a first food component; and extruding a carrier adjacent the first food component.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the embodiments which follow.

DETAILED DESCRIPTION OF EXEMPLARY EMBODIMENTS

Before proceeding to the detailed description of preferred and exemplary embodiments, several comments can be made about the general applicability and the scope thereof.

As used in this description, "food product" or "prepared foods" includes whole, ground, blended, and/or emulsified protein based products (e.g., meat, non-meat such as soy, etc.)

in a variety of forms such as links or rings (e.g., sausage, bratwurst, hot dogs, wieners, meatloaf, loaf, meatballs, etc. with or without a collagen or non-collagen casing), logs, or other divisions. The system and process are directed to co-extruding food components to manufacture a food product.

In one embodiment, a first food component is co-extruded with a second food component and one or more layers of a collagen gel that forms a casing around the first food component and the second food component. The first food component may be a protein based dough such as meat, soy, etc. as can be found in known ground products (e.g., such as sausage, meatloaf, loaf, meat ball, etc.) or emulsified products (e.g., hot dogs, etc.). The second food component may be a different product intended to provide a desired presentation, taste, texture, or consumption experience (e.g., a vegetable, fruit, dairy, another meat, etc.).

In another embodiment, a food component (e.g., a protein based dough) is co-extruded with a first (or inner) collagen gel layer with a first additive that forms a casing around the food component and a second (or outer) collagen gel layer with a second additive that forms a casing around the first collagen layer and the food component.

In another embodiment, a first food component (e.g., a protein based dough) is co-extruded with a second food component (e.g., vegetable, fruit, dairy, another meat, etc.); a first (or inner) collagen gel layer with a first additive that forms a casing around the first food component and the second food component; and a second (or outer) collagen gel layer with a second additive that forms a casing around the first collagen layer, the first food component and the second food component.

Figures 1, 3:
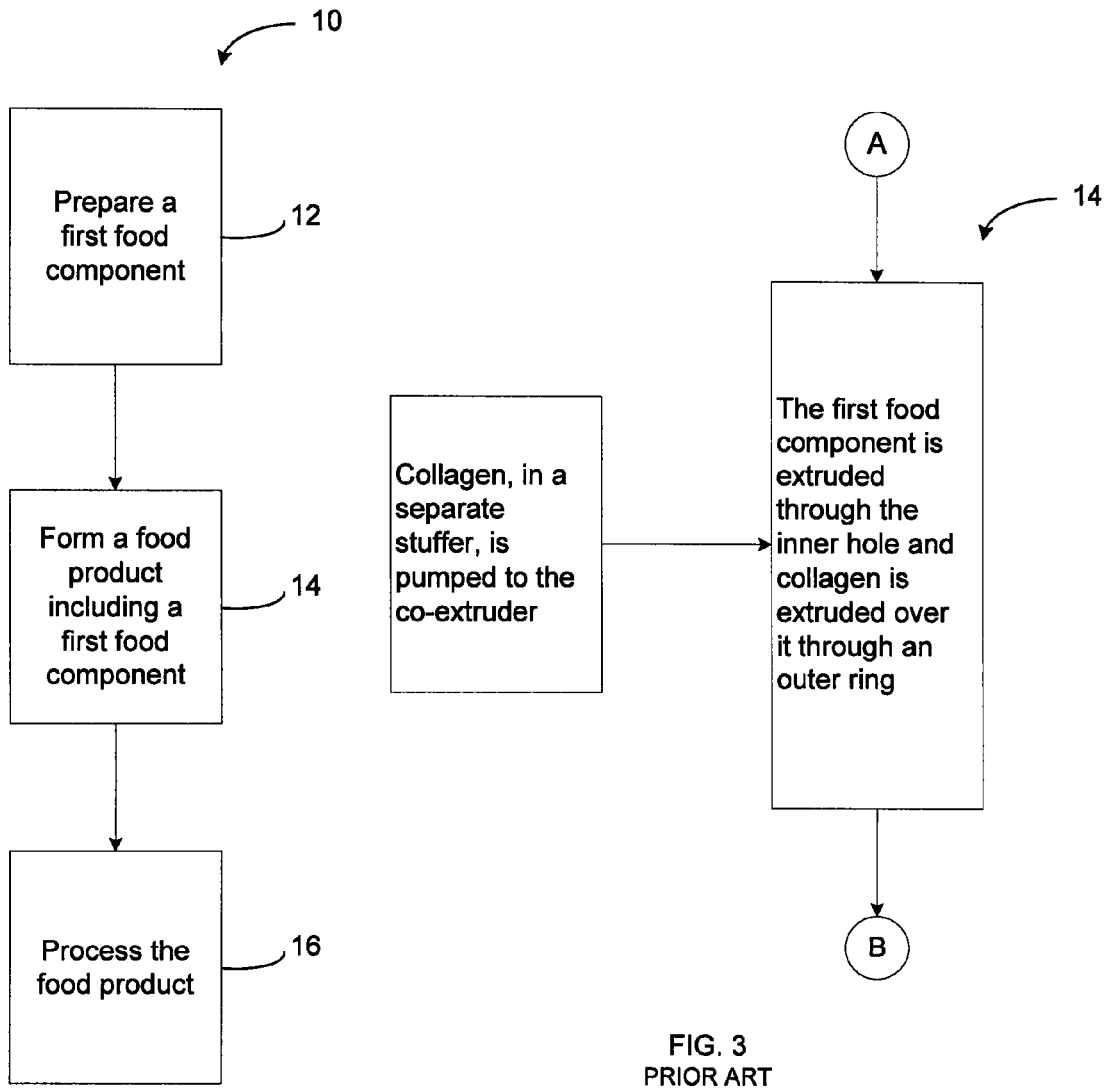
FIG. 1 is a schematic block flow diagram of a method for preparing a food product such as sausage links according to an exemplary embodiment.
FIG. 3 is a schematic block flow diagram of a prior art method for forming a food product for the method of FIG. 1 according to an exemplary embodiment.

Proceeding now to descriptions of exemplary embodiments, FIG. 1 illustrates a schematic block flow diagram of a system and process 10 for manufacturing food products (e.g., sausage, links, etc.). According to an exemplary embodiment, a first food component (e.g., a "dough" or blend) is prepared (step 12). The first food component is then provided (e.g., fed, conveyed, etc.) to an apparatus such as a co-extrusion machine. The co-extrusion machine extrudes the first food component and other materials, including a collagen gel to form a co-extruded rope or strand (step 14). The co-extrusion machine includes an extrusion head with a plurality of openings for the various extruded components. After the co-extrusion machine forms the food product, the food product is processed and packaged (step 16).

Figure 2:
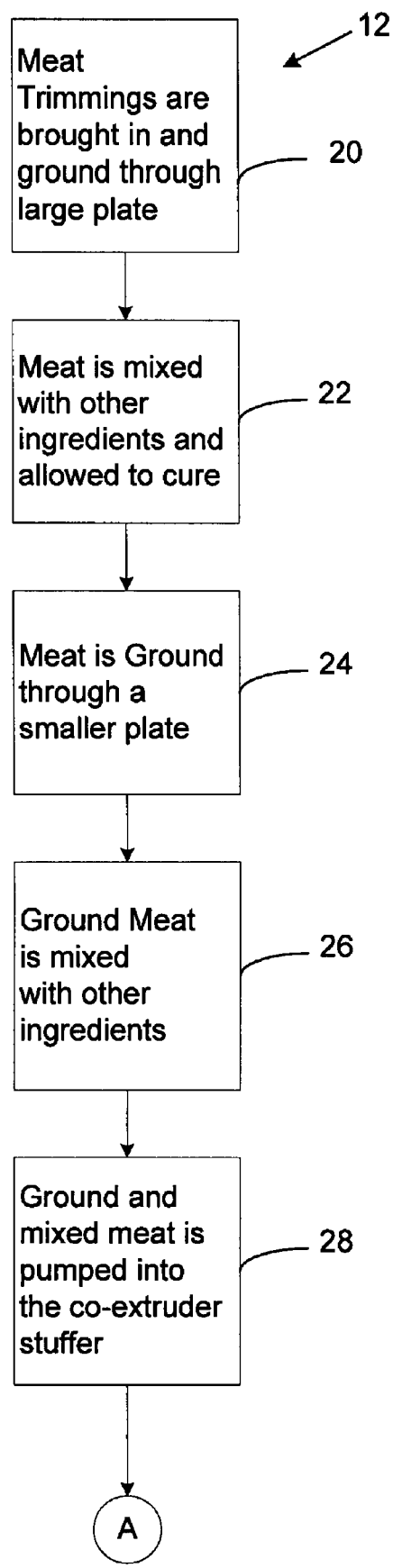
FIG. 2 is a schematic block flow diagram of a method for preparing a meat base for the method of FIG. 1 according to an exemplary embodiment.

Referring to FIG. 2, an exemplary method 12 of preparing the first food component is illustrated. In this example, the first food component is a meat-based food component. Meat trimming or other food materials are ground through a large grinder plate to form a coarsely ground base (step 20). The ground meat is then mixed with additives or ingredients such as salt, water, and phosphate and is allowed to cure for a period of time (e.g., overnight (step 22)). The blended meat is ground through a smaller grinder plate (step 24). The coarsely ground meat is blended with additional products such as water, seasonings, and other particulates (step 26). The blended meat is provided to the co-extrusion machine as the first food component (step 28).

Referring to FIG. 3, an exemplary prior art method 14 for forming a food product is illustrated. The co-extrusion machine extrudes the first food component and a collagen gel material on the outer surface of the first food component to form a co-extruded rope or strand. The co-extrusion machine 12 may have one or more extrusion heads to provide single, dual, etc. co-extruded ropes. The collagen gel applied to the outer surface of the first food component is then solidified (i.e., coagulated, congealed, firmed, set, hardened, dried, etc.) by subsequent operations to provide a casing (e.g., encasement, skin, etc.) for the first food component. The collagen gel is typically a protein extracted from animal components (e.g., skin, such as beef skin, etc.). According to an exemplary embodiment, the collagen gel is solidified by a process comprising dewatering and cross-linking.

Figure 4:
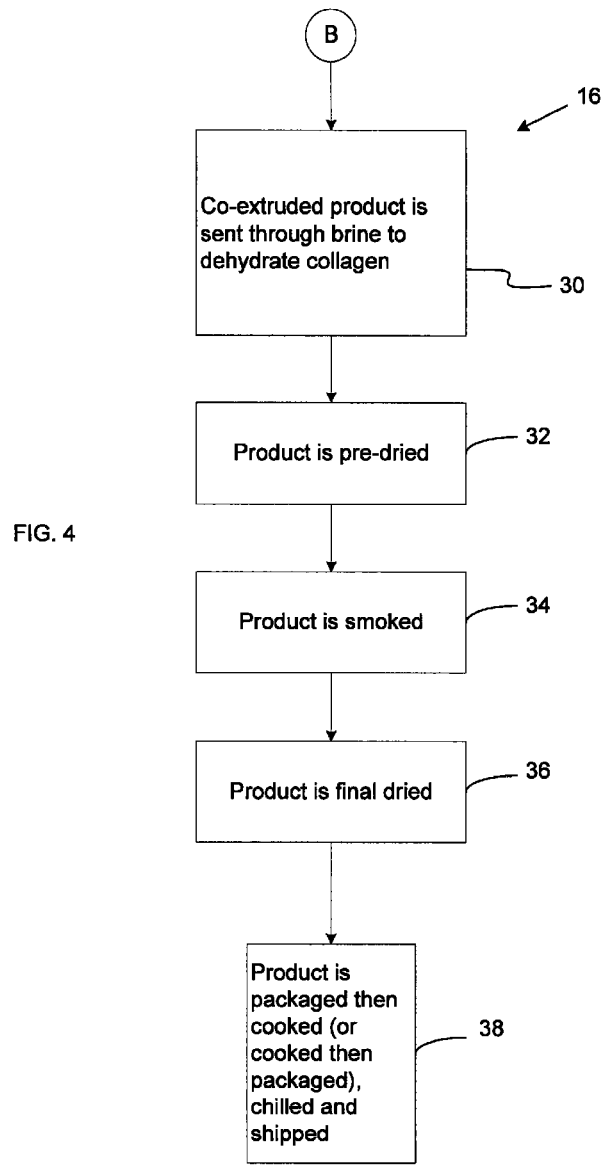
FIG. 4 is a schematic block flow diagram of a method for processing a food product for the method of FIG. 1 according to an exemplary embodiment.

Referring to FIG. 4, an exemplary method 16 for processing a food product is illustrated. According to an exemplary embodiment, the co-extruded rope from the co-extrusion machine is conveyed to an apparatus (e.g., a brining unit) to transform (e.g., solidify, etc.) the collagen gel into a casing that surrounds the first food component (step 30). The brining step is intended to firm or strengthen the collagen gel coating sufficiently for additional manufacturing processes. To form the casing, the brining unit subjects the co-extruded rope to a solution that removes water content from the collagen gel. According to an exemplary embodiment, the solution (e.g., brine salt, sodium chloride, di-potassium phosphorous (DKP), calcium chloride, calcium lactate, etc.). According to other embodiments, the solution may be any of a variety of different salts or solutions that remove water from the gel.

After the collagen gel is at least partially solidified, the continuous co-extruded strand of the first food component and collagen gel may be conveyed to a crimper. The crimper forms the continuous strand into segmented portions or links in a pinching operation and separates the links. This exemplary embodiment provides a strand of links; alternatively, this process may be used to provide a continuous or unsegmented food product or a process including a slicer that replaces the crimper to provide separate food products.

The separated links are then conveyed to a pre-dry zone where heat is applied to the links to further solidify or dry the collagen gel and to raise the core temperature of the links to partially cook the food product (step 32). Further solidification of the collagen continues the process of increasing the strength of the casing by removing additional water content from the collagen gel (which by now has been partially coagulated/solidified). The brining step and the heat shrink the gel down to a skin layer.

After the collagen gel is further solidified by the heat in the pre-dry zone, the links are conveyed to an apparatus (e.g., a "liquid smoke zone") to set the collagen (step 34) with a cross-linking agent or material (e.g., Maillard cross-linking reaction). In the liquid smoke zone, a material (e.g., liquid smoke) is applied to the links to set or "cross-link" fibers of the collagen so that the collagen layer will not re-absorb water and return to a gel state or condition. The cross-linking material may be applied by any of a variety of conventionally known methods, such as injection, spraying, pouring, deluging, bathing, emersion, drenching, or the like. The cross-linking material is conventionally referred to as "liquid smoke" due to its acid content and presence of aldehydes (e.g., glutaraldehyde, glyceraldehyde, formaldehyde, etc.), but may be any of a variety of natural or synthetic chemicals that cross-links the fibers of the collagen (e.g., food grade or otherwise allowed by the Food and Drug Agency (FDA) or the U.S. Department of Agriculture (USDA)). The cross-linking material may also be configured to be flavorless or to provide a desired flavor (e.g., smoke, etc.).

After the liquid smoke is applied, the links are conveyed to an apparatus for further heating to be final dried (e.g., a post-dry zone) to further partially cook the first food component, to further dry the gel, and to dry the liquid smoke (step 36). Drying of the liquid smoke sets the flavor and color of the liquid smoke and prevents the liquid smoke from being washed away in subsequent operations. After the post-dry zone, the links may be conveyed to a water spray apparatus to rinse residue and non-set liquid smoke.

Still referring to FIG. 4, after the drying and smoking processes, the links are conveyed to a packaging apparatus. The packaging apparatus packages the links in a thermoplastic material in a vacuum atmosphere that provides a desired seal, tightly conforms to the links, and removes any air from inside of the packaging (step 38). Such packaging is intended to minimize potential exposure to oxygen, moisture, and contaminants and to facilitate the cooking process by eliminating space between the exterior of the packaging and the links to enhance conduction of heat energy. According to alternative embodiments, the links may be packaged by any of a variety of conventional machines in a variety of packaging configurations and materials.

The packaged links are then conveyed to an apparatus (e.g., water cook zone) that completes the cooking cycle (i.e., provides a packaged link that is fully cooked). According to an exemplary embodiment, the packaged links are submerged in water heated to a predetermined temperature for a predetermined amount of time. Alternatively, the packaged links are subject to heated water by any of a variety of means (e.g., spraying, pouring, deluging, or the like). The temperature of the water and the time that the packaged links are submerged will vary depending on the amount of links, the formulation and size of the link, and the like. Completing the cooking process in the packaging is intended to reduce the potential for contamination of the food product, which might occur if the food product is fully cooked and then packaged. Such contamination also extends the shelf life of the food product without having to use preservatives. Alternatively, the packaged links may be partially cooked, or the links are cooked and then packaged.

The cooked links are then conveyed to an apparatus to cool the heated links (e.g., a water chiller zone). According to an exemplary embodiment, the links are subjected to chilled water (e.g., spraying, pouring, deluging, bathing, emersion, etc.) that lowers the core temperature of the links to a temperature at a rate designated by regulations of USDA or other entities.

Figure 5:
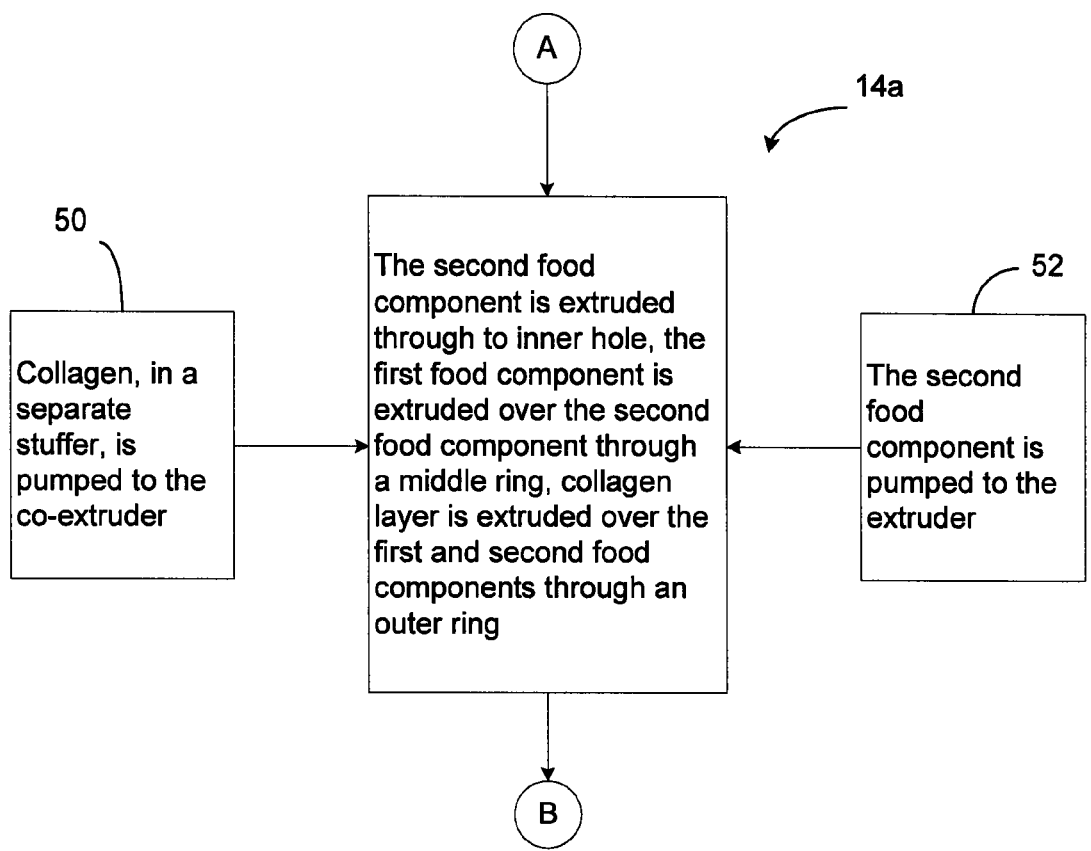
FIG. 5 is a schematic block flow diagram of a method for forming a food product including a secondary product for the method of FIG. 1 according to an exemplary embodiment.

Referring now to FIG. 5, a method 14a for forming a food product is illustrated according to another exemplary embodiment. The method 14a of FIG. 5 is similar to the method 14 of FIG. 3 except a secondary food component is introduced. The process 14a is shown to include providing the ingredients to the co-extruder (the collagen in step 50, the meat or first component in B, and the second food component in step 52).

Figure 6A:
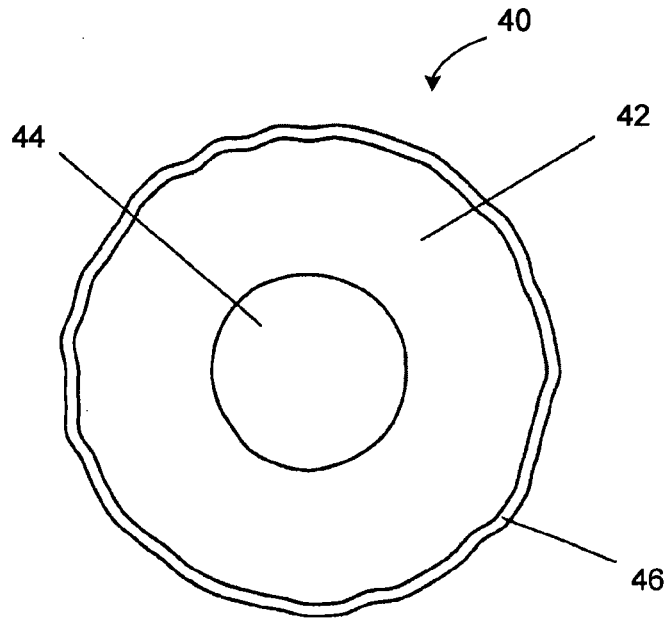
FIGS. 6A-6C is a schematic cross section of a food product formed with the method of FIG. 5 according to an exemplary embodiment.
Figure 6B:
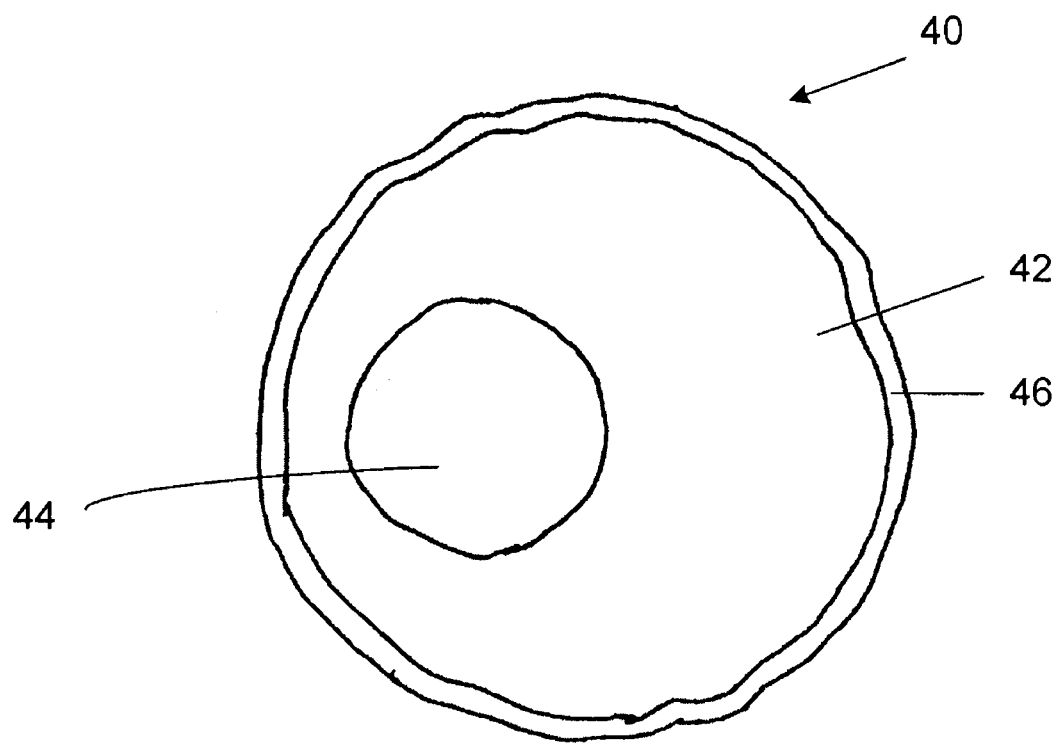
Figure 6C:
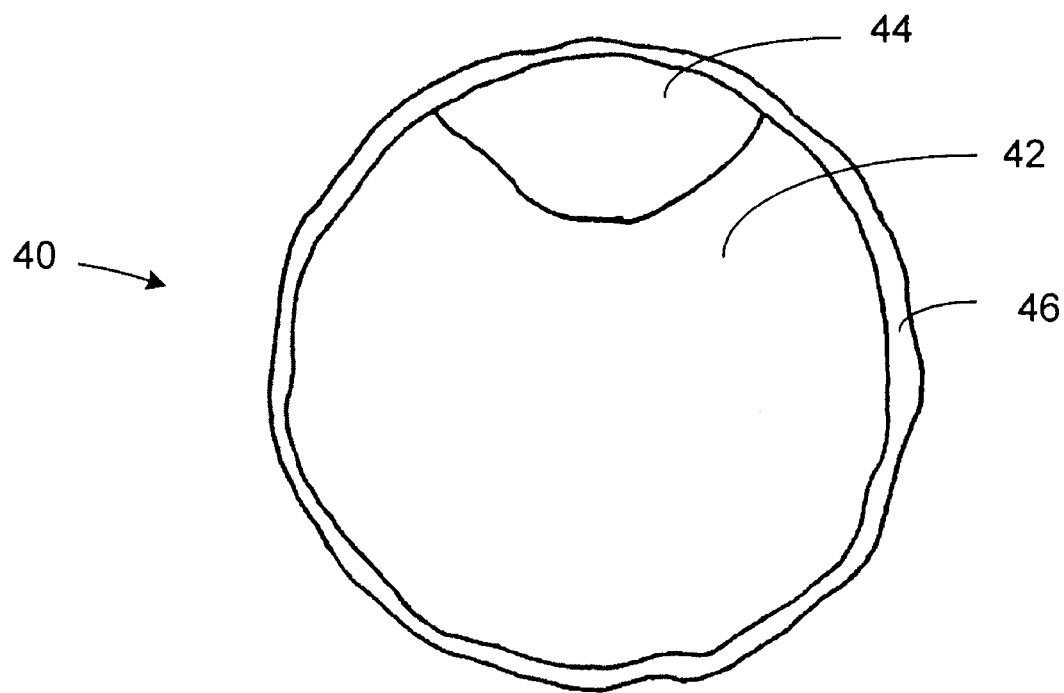

The co-extrusion machine includes a triple-layer head that allows the machine to simultaneously extrude three co-axial streams as shown in FIGS. 6A-6C to form a three layer extruded rope or strand that is formed into links or individual products (referred to as a food product 40). The food product 40 includes a first food component 42 (e.g., primary, base, etc.), a second food component 44, and a collagen-based casing or layer 46. According to an exemplary embodiment, the secondary component 44 may be a food product that is distinct from the first component 42 and is extruded from a central nozzle or outlet to provide an inside layer or filling. According to various exemplary embodiments, the first component 42 is the protein-based component (e.g., meat, soy, etc.), and the second component 44 may be any food product that compliments the first component 42, including but not limited to fruit, vegetable, dairy, meat (same or different type and/or texture), additives, starch, spices, fillers, or the like, and/or combinations thereof. For example, the second component 44 may be eggs, roasted peppers, hash brown potatoes, broccoli, cheese, fruit pieces, sauerkraut, or the like. According to an exemplary embodiment, the first component 42 may be a "meat component" and the secondary component 44 may be a "non-meat" component.

The co-extrusion machine extrudes the first food component 42 from a second nozzle or outlet (e.g., from a ring surrounding the central nozzle) to surround the second food component 44. The co-extrusion machine extrudes a collagen gel material 46 from a third nozzle or outlet (e.g., from a ring surround the second nozzle) on the outer surface of the first food component 42. The collagen gel 46 applied to the outer surface of the first food component 42 is then solidified by subsequent operations as described above to provide a casing (e.g., encasement, skin, etc.) for the first food component 42. After being formed, the extruded food product 40 may then be cooked, dried or further processed as described above according to one exemplary embodiment.

While the FIGURES show the first food component 42 generally surrounding the (e.g., a vegetable, fruit, dairy, another meat, etc.) 44, according to another exemplary embodiment, the first food component 42 may only partially surround the second food component 44. While the second food component 44 is shown as being centered, according to other exemplary embodiments the second food component 44 may be off-center (see FIGS. 6B, 6C). According to still another exemplary embodiment, the first food component 42 and the second food component 44 may be extruded next to each other, so that each component has a generally semi-circular or other cross-section. According to yet another exemplary embodiment, the relative positions of the first food component and the second food component are reversed so the second food component at least partially surrounds the first food component.

The second food component 44 and first food component 42 are provided in separate layers instead of mixed together to retain the unique textures of both the second food component 44 and the first food component 42. Including a second food component 44 with the first food component 42 is intended to provide a unique flavor and eating experience. The addition of the second food component 44 may provide a more varied, multi-component meal (e.g., with the addition of vegetables to the meat component).

The first food component 42, the second food component 44, and the collagen gel 46 are each mixed separately and pumped to the co-extrusion machine by independent pumping devices. Each independent pumping device can provide a product at the same flow rate or at a different flow rate. For example, according to one exemplary embodiment, the flow of the second food component 44 may be periodically reduced so that the co-extrusion machine extrudes only the first food component layer 42 and the collagen gel layer 46 so that the extruded strand includes discreet portions or pockets of the second food component 44 that are completely surrounded or encapsulated by the first food component 42. The extruded strand may then be separated at the "all meat" portions so the sausage links do not reveal the second food component 44.

FIG. 6A shows a food component with the second component 44 in generally the center of the first component 42. FIG. 6B and FIG. 6C show the second food component 44 off-center of the first food component 42.

Figure 7:
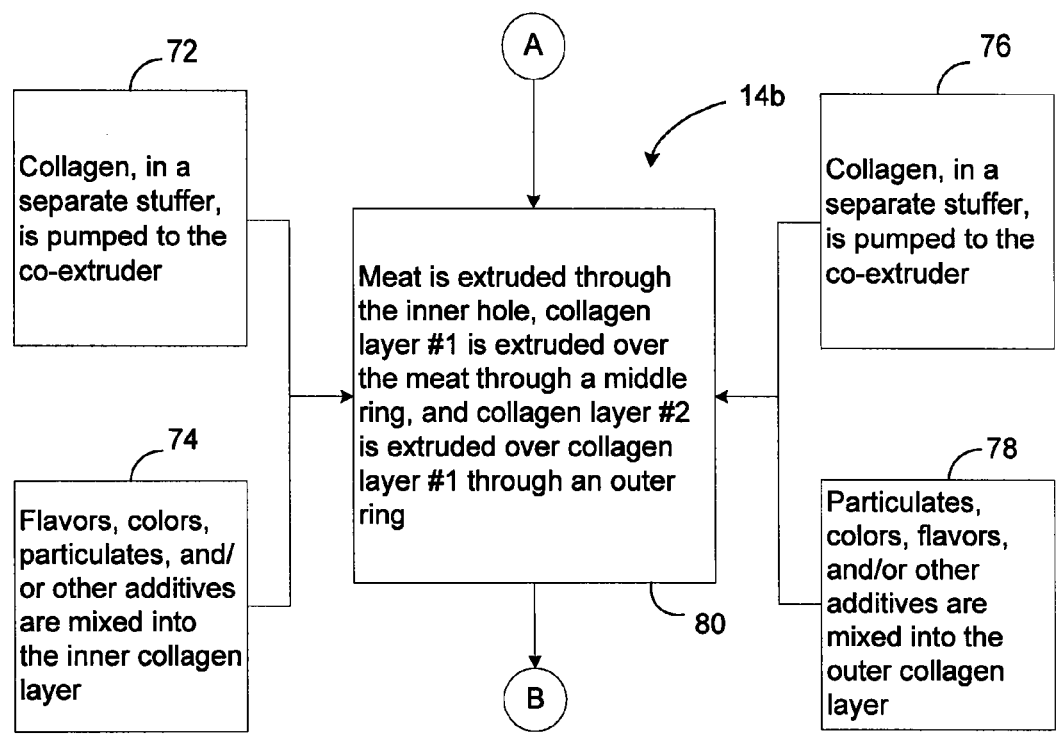
FIG. 7 is a schematic block flow diagram of a method for forming a food product including a first collagen layer and a second collagen layer for the method of FIG. 1 according to an exemplary embodiment.
Figure 8:
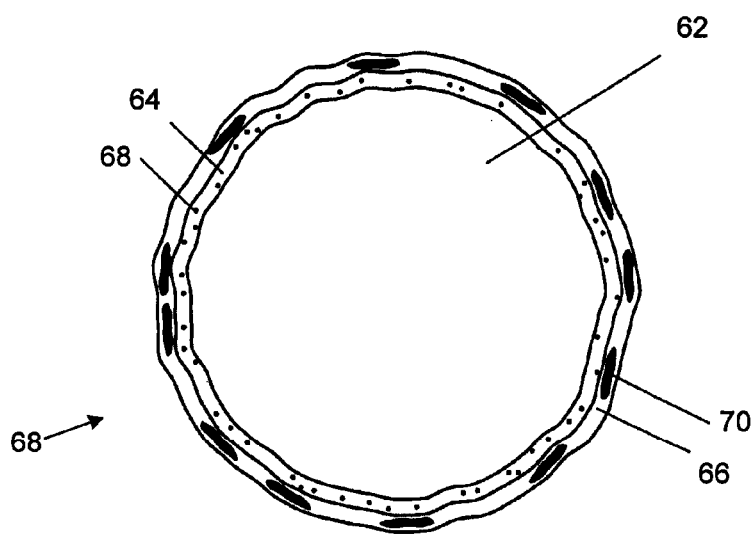
FIG. 8 is a schematic cross section of a food product formed with the method of FIG. 7 according to an exemplary embodiment.
Figure 9:
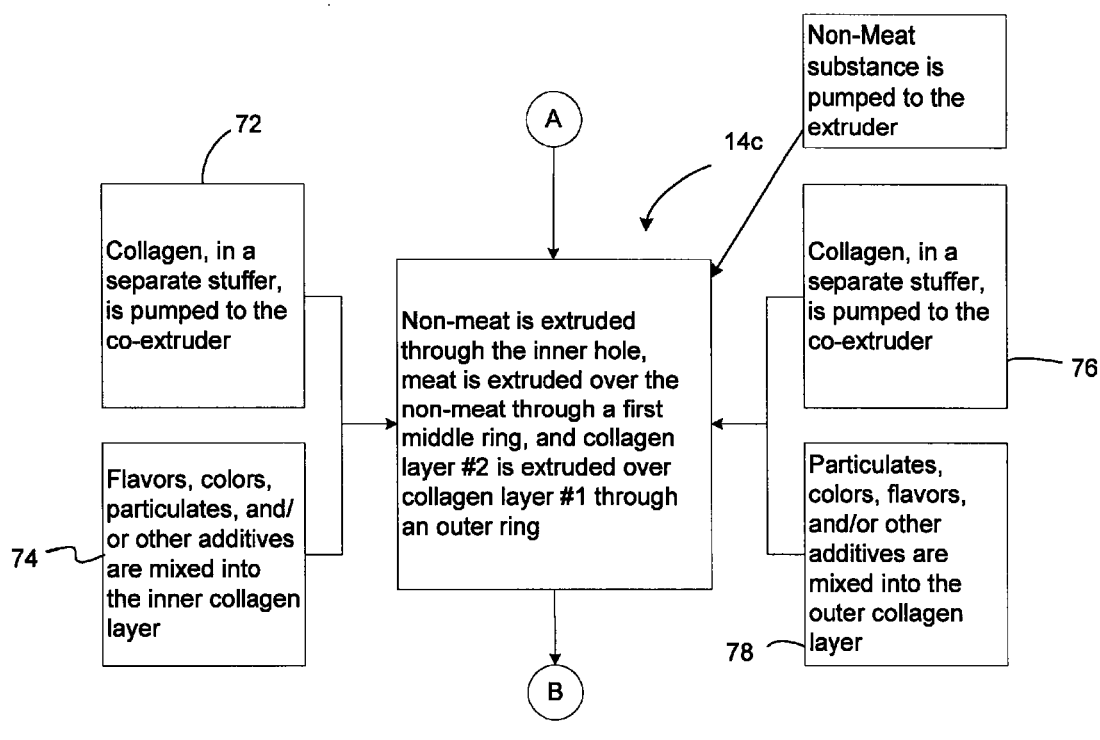
FIG. 9 is a schematic block flow diagram of a method for forming a food product including a secondary product, a first collagen layer, and a second collagen layer for the method of FIG. 1 according to an exemplary embodiment.

Referring now to FIG. 7, a method 14b for forming a food product 60 is illustrated according to another exemplary embodiment. Referring to FIG. 8, the food product 60 includes a primary or first component 62 (e.g., meat), a first collagen layer 64, and a second collagen layer 66. The first collagen layer 64 includes a first additive 68. The second collagen layer 66 includes a second additive 70. The method 14b of FIG. 7 is similar to the method 14 of FIG. 3 except the second collagen layer 66 is introduced. The process 14b is shown to include pumping collagen to the co-extruded (steps 72, 74), mixing additives 68 to collagen that will form the first collagen layer 64 (step 76), and mixing additives 70 to collagen that will form the second collagen layer 66 (step 78), followed by the co-extrusion of the meat 62, and collagen layers 64, 66 (step 80).

The co-extrusion machine includes a triple-layer head that allows the machine to simultaneously extrude three co-axial streams as shown in FIG. 8 to form a three layer extruded rope or strand. According to an exemplary embodiment, the meat component 62 and a first collagen gel material 64 are extruded to form a rope or strand as described above. The co-extrusion machine further extrudes a second collagen layer 66 on the outer surface of the first collagen layer 64. The first collagen gel layer 64 and the second collagen gel layer 66 are then solidified (i.e., coagulated) by subsequent operations as described above to provide a casing (e.g., encasement, skin, etc.) for the meat component material 62. After being formed, the extruded food product 60 may then be cooked, dried or further processed as described above according to one exemplary embodiment.

The first collagen layer 64 and or the second collagen layer 66 may include additives to enhance the taste and/or appearance of the meat component (and/or other additives as discussed herein). According to an exemplary embodiment, the first collagen gel layer 64 may include a first additive 68 such as a flavoring and/or coloring. The flavoring may be added to the gel, for example, as a liquid or powder before being pumped to the co-extrusion machine. Some flavoring compounds may be volatile and escape the food product during subsequent cooking or other processing. By including the flavoring compound with the first collagen gel layer 64 and then providing a second collagen gel layer 66 around the first collagen gel layer 64, the flavor is "trapped" (i.e., encased, enclosed, maintained, kept, etc.) within the food product 60 until it is consumed. According to other exemplary embodiments, the first collagen gel layer 64 may also include particulates.

According to an exemplary embodiment, the second collagen gel 66 layer may include a second additive 70 such as particulates, colorings, and/or other additives as discussed herein. For instance, the second additive 70 may contain parsley flakes, red pepper flakes, distinctive colors, etc. According to another exemplary embodiment, the second additive 70 may include flavoring and/or coloring. The flavoring may be a volatile flavoring compound so that a distinctive smell is released during the cooking process. As such, some flavoring or aroma can be released during cooking (to be enjoyed by the consumer) without losing flavoring.

Figure 10A:
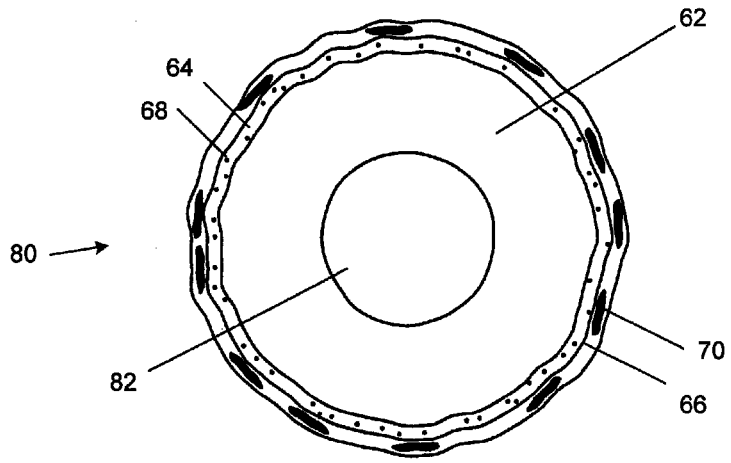
FIGS. 10A-C a schematic cross section of a food product formed with the method of FIG. 9 according to an exemplary embodiment.
Figure 10B:
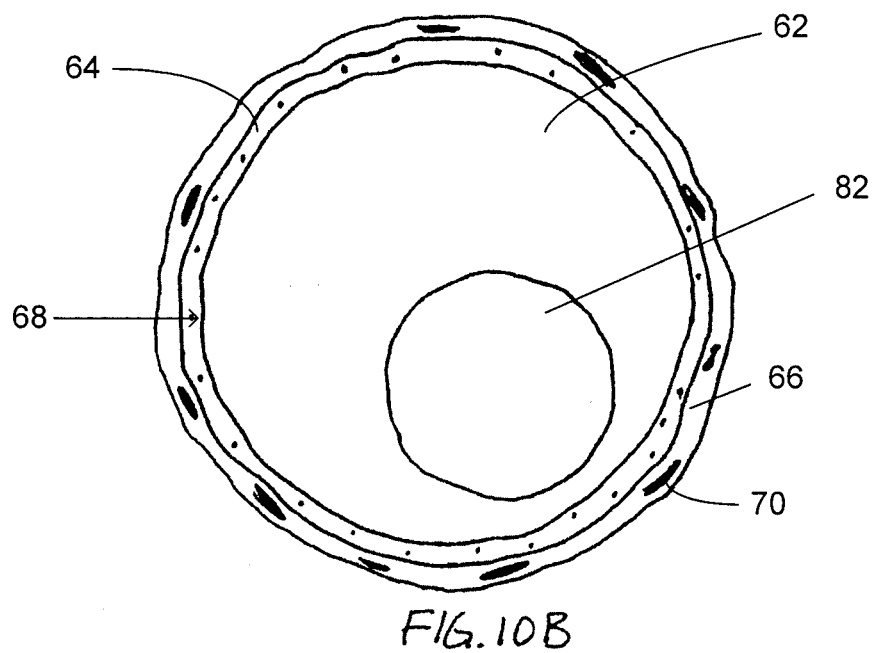
Figure 10C:
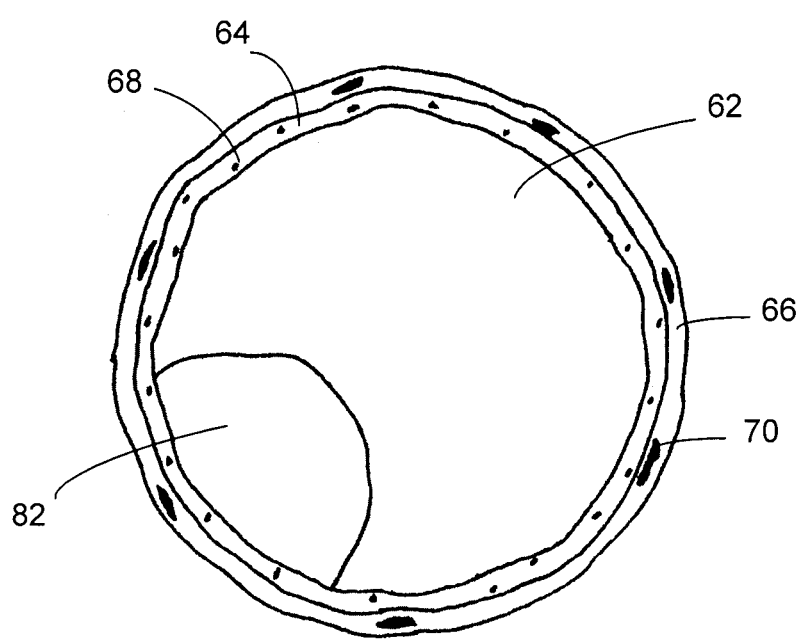

Referring now to FIGS. 9 and 10A-C, a method 14C for forming a food product 80 is illustrated according to another exemplary embodiment. The method of FIG. 9 includes the addition of a non-meat component 82 as in the method of FIG. 5 and a second collagen gel layer 66 as in the method of FIG. 7. The co-extrusion machine includes a quadruple-layer head that allows the machine to simultaneously extrude four co-axial streams as shown in FIGS. 10A-C to form a four layer extruded rope or strand. According to an exemplary embodiment, the non-meat component 82 and the meat component 62 are extruded to form a rope or strand as described above. The co-extrusion machine further extrudes a first collagen layer 64 on the outer surface of the meat component 62 and extrudes a second collagen layer 66 on the outer surface of the first collagen layer 64. The first collagen gel layer 64 and the second collagen gel layer 66 are then solidified (i.e., coagulated) by subsequent operations as described above to provide a casing (e.g., encasement, skin, etc.) for the meat component material. After being formed, the extruded food product 80 may then be cooked, dried or further processed as described above according to one exemplary embodiment.

FIG. 10A shows the food component 80 with the non-meat (or second) component 82 in generally the center of the meat (or first component). FIG. 10B and FIG. 10C show the non-meat portion 82 off-center of the meat portion 62.

Figure 11:
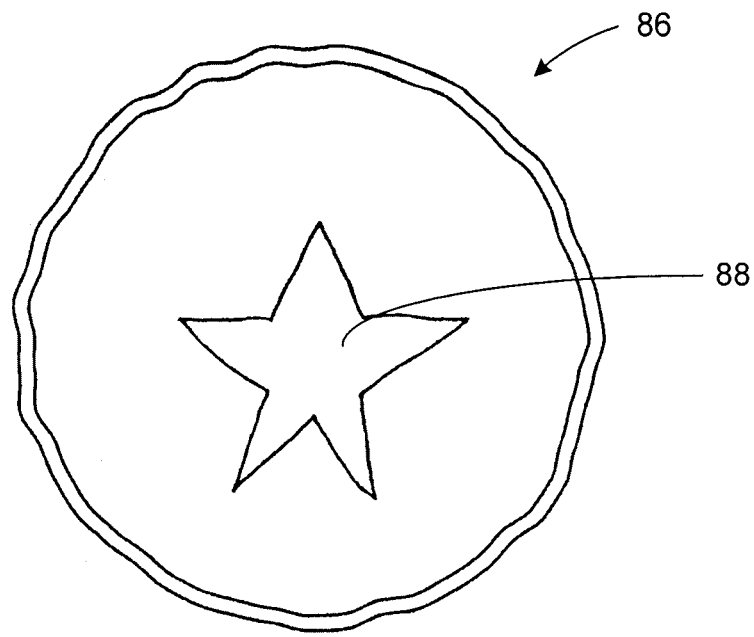
FIGS. 11 and 12 show cross section views of exemplary embodiments with the second food component having non-circular shapes.
Figure 12:
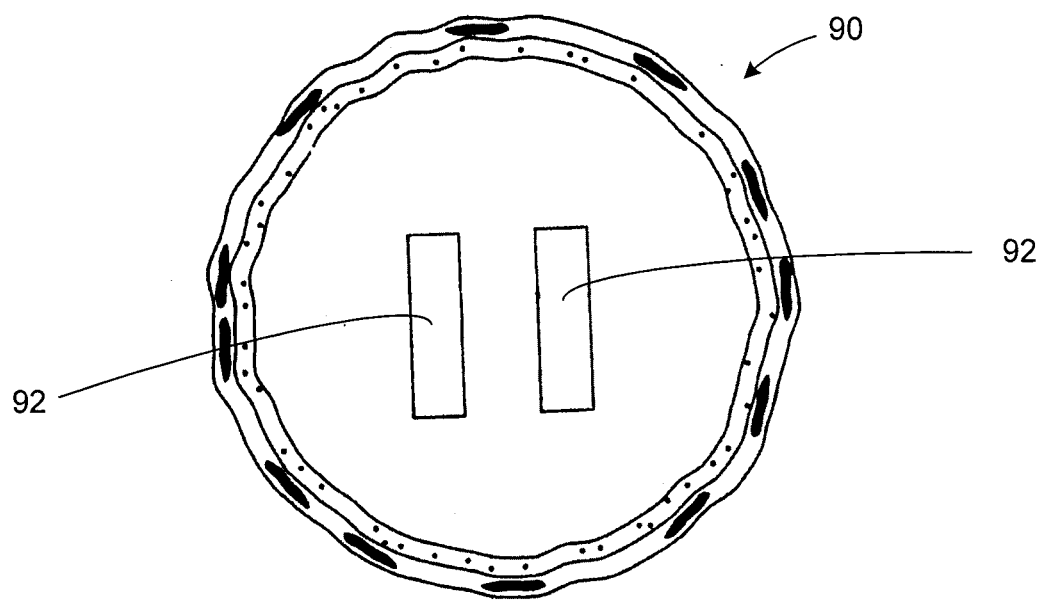

FIGS. 11 and 12 show cross section views of exemplary embodiments with the second food component having non-circular shapes. FIG. 11 shows a food product 86 having a star-shaped second food component 88. FIG. 12 shows a food component 90 having a pair of rectangular shaped second food components 92. According to alternative embodiments, the second food components may have any of a variety of shapes, quantities (e.g., same or different food components), or the like.

According to other exemplary embodiments, one or more components may be extruded separately. For example, a one component may be extruded in a first machine and then provided to a second machine that extrudes a second component around the first component.

Figure 13:
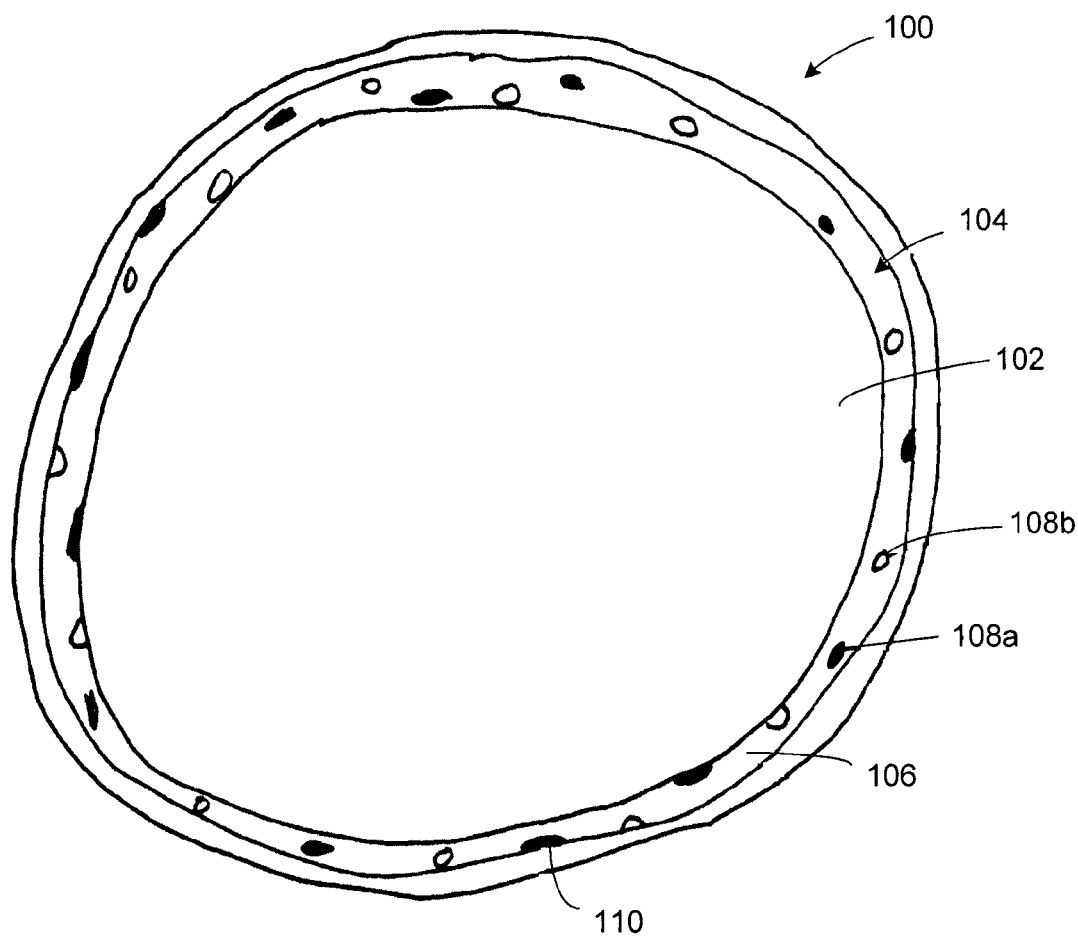
FIG. 13 shows a section view of a food product having a base component and a carrier component with one or more additives according to an exemplary embodiment.

FIG. 13 shows a section view of a food product 100 according to an exemplary embodiment. The food product 100 includes a base (or first) component 102 and a carrier (or second component) 104.

The base component 102 may be any of a variety of first components (e.g., meat, soy, or other protein, or other food components that provide the first component to a food product). The meat may be emulsified meat, injected/marinated whole muscle meat, or other meat variations. The base component 102 may be an elongated mass (e.g., logs, loaves, segments, etc.) of lunchmeat, sausage, etc., that is configured to be sold whole, or sliced or otherwise divided prior to consumption.

The carrier 104 includes a matrix 106 and one or more additives 108 (e.g., shown as additive 108a and additive 108b in FIG. 13) suspended in the matrix 106. The additive 108 may be intended to provide any of a variety of sensations and/or ingredients to the base component 102 (e.g., flavoring, spice, coloring, texture, anti-microbial, probiotics, combinations thereof, etc.). The additive may be a liquid, particulate, semi-solids, or combinations thereof. The carrier 104 adheres to the exterior of the base component 102. According to an exemplary embodiment, the matrix 106 is a thermo-reversible coating so that when heated above a certain temperature, the thermo-reversible gel is in a liquid form. When the thermo-reversible coating is cooled below a certain temperature, the coating sets and becomes solid or semi-solid. The thermally-reversible coating may have a carbohydrate base (e.g., thermally reversible gel, gum, etc.) or a protein base (e.g., gelatin, etc.). Alternatively, the carrier may be any of a variety of materials that provide the desired characteristics of flowing, adhesion to the base component, and the like (e.g., starch, gums, alginate, cellulose fiber, gelatin, etc.). The carrier layer 104 in an exemplary embodiment is not required to provide functional containment of the base food component. Instead, the carrier 104 is intended to suspend the additive and to adhere to the food product rather than to the casing. According to alternative embodiments, the carrier layer 104 may be functional to the overall food product (e.g., containment of the food item, etc.).

During an exemplary co-extrusion process, a casing 110 is provided to hold the base component 102 and the carrier 104 in place during later processing steps and transportation. The casing 110 may be any of a variety of conventionally known food product casings (e.g., plastic, solidified collagen, natural casing, etc.). The casing 110 is configured to encase the base component 102 and the carrier 104 for storage and transportation, but removed prior to later manufacturing steps or consumption.

Figure 14:
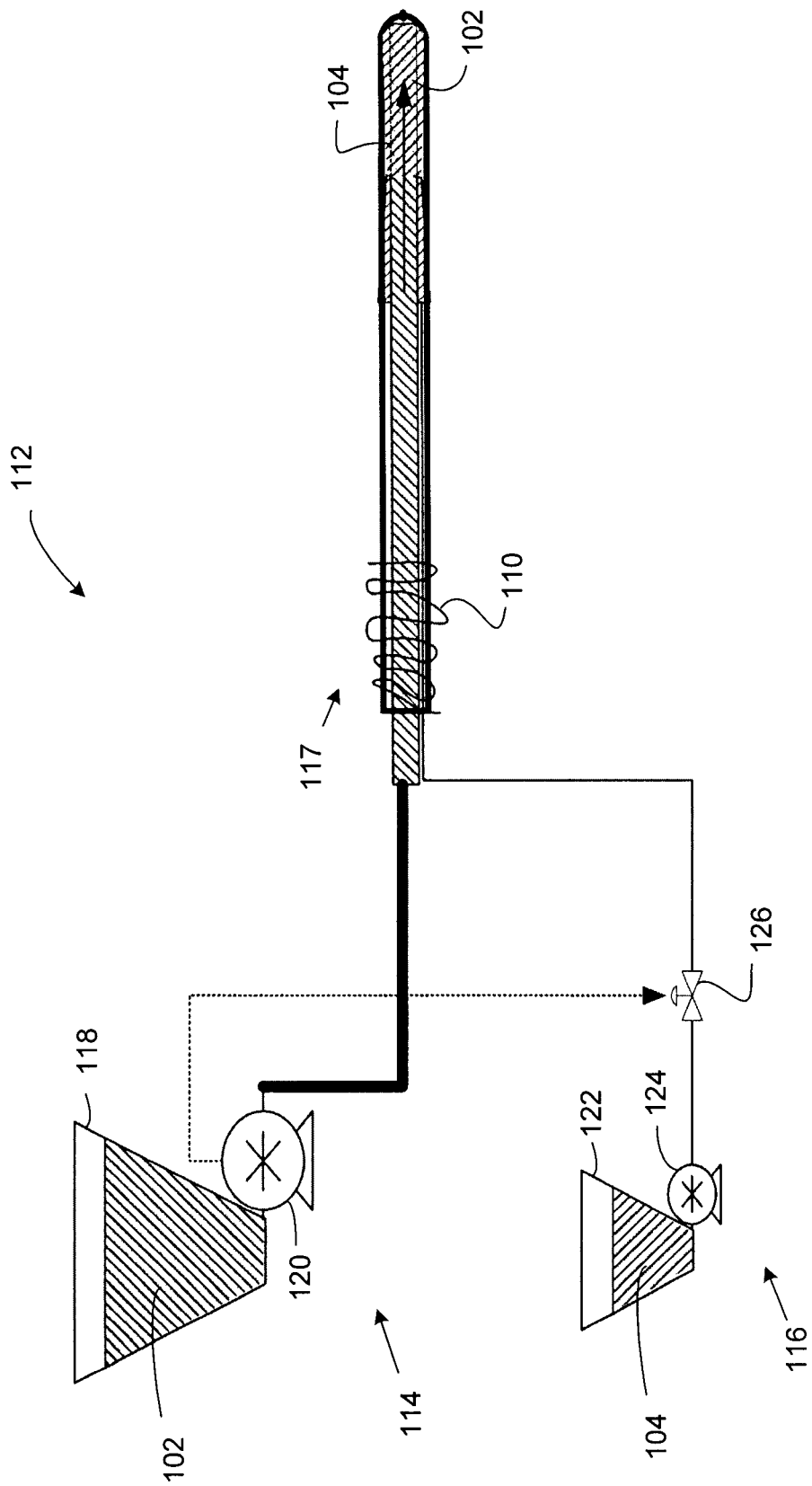
FIG. 14 shows a schematic representation of a system for manufacturing the food product according to an exemplary embodiment.

FIG. 14 shows a schematic representation of a system 112 for manufacturing the food product 100 of FIG. 13 according to an exemplary embodiment. The system 112 is configured to produce the base component 102 with the carrier layer 104 (e.g., coating, etc.) to provide a desirable taste, flavoring, appearance, color, texture, aroma, or one or more functional ingredients/additives.

The system 112 includes a supply line 114 for the base component 102 and a supply line 116 for the carrier 104 and a dual horn co-extruder system 117. The supply line 114 includes a hopper 118 for the base component 102 and a positive displacement pump 120. The supply line 116 for the carrier 104 is temperature controlled and includes a hopper 122, a positive displacement pump 124, and a control valve 126. The control valve 126 is operated (e.g., by a controller or control system) based on meat volume being pumped by pump 120. The supply line 116 is heated to a predetermined (elevated) temperature so that the carrier 104 remains in a gel liquid form. The additive or additives 108a, 108b is blended together with the carrier matrix 106 at a controlled temperature to keep matrixing gel or liquid form and to keep the particulates (additive/s) in suspension status during storage in the hopper and pumping process. The blend is then pumped through the dual horn system 117 with the base component 104 in the center and the carrier 104 around the exterior of the base component 104 so that the additive 108 (e.g., seasoning) enrobes the base component 102. The carrier 104 solidifies when removed from the heated environment (and when contacting with the cooler base component 102, particularly where the base component is a larger mass kept below 40 degrees F.). The casing 110 surrounds the base component/carrier to hold the components in place. The encased base component/carrier may be held in or on a mold or direct cooked and chilled to form a desired shape. The encased food product 100 then progresses to other operations as required for the specific food product (e.g., cooking, partially cooking, slicing, packaging, etc.). After the casing 110 is removed, the additives 108 (e.g., seasoning/flavors) will continue to be attached to the surface of the base component 102. Thereafter, the food product may undergo further process steps (e.g., slicing, stacking, packaging, etc.) as desired or according to the end product.

Figure 15:
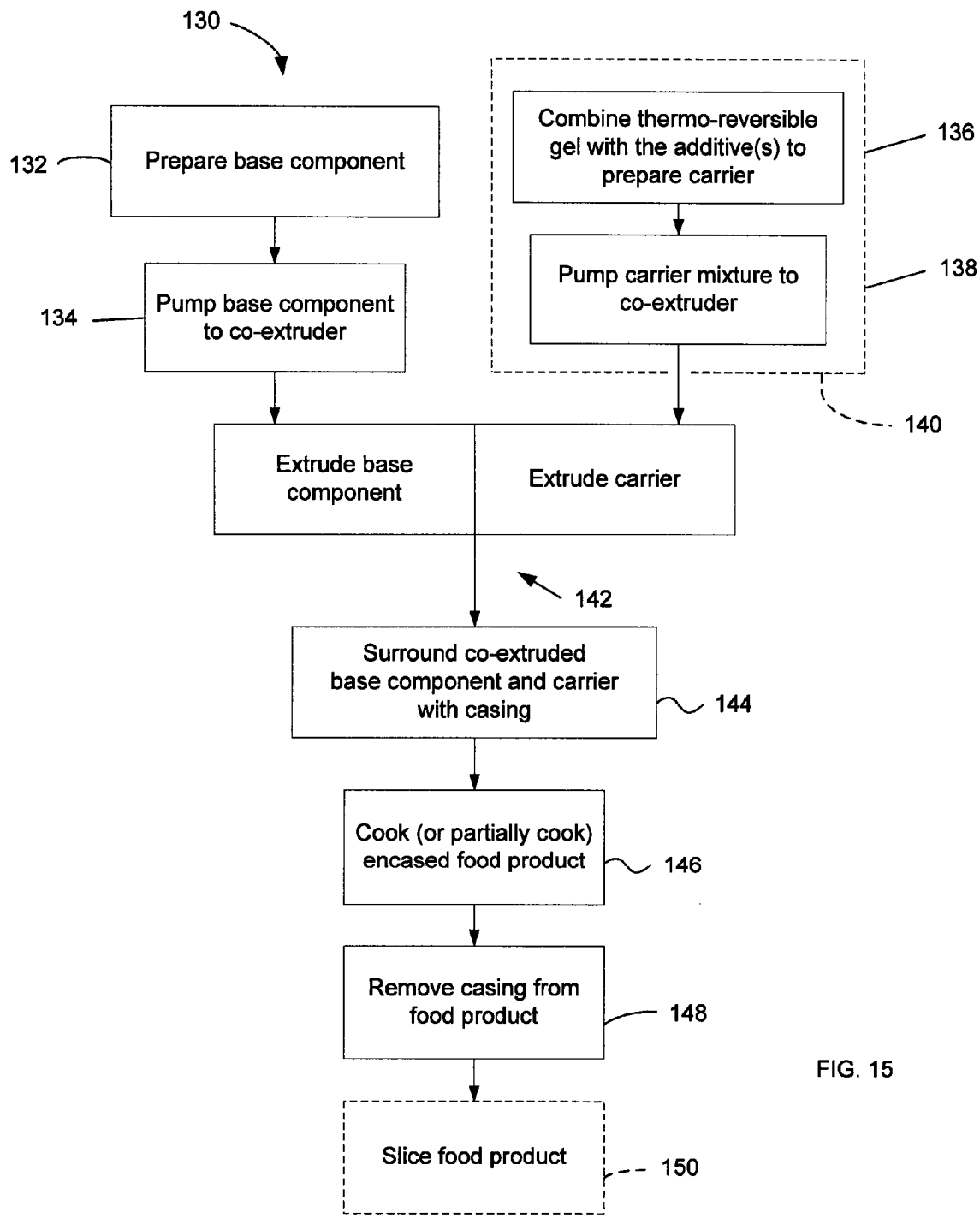
FIGS. 15 and 16 show schematic block flow diagrams of exemplary methods for forming the food product of FIG. 13.
Figure 16:
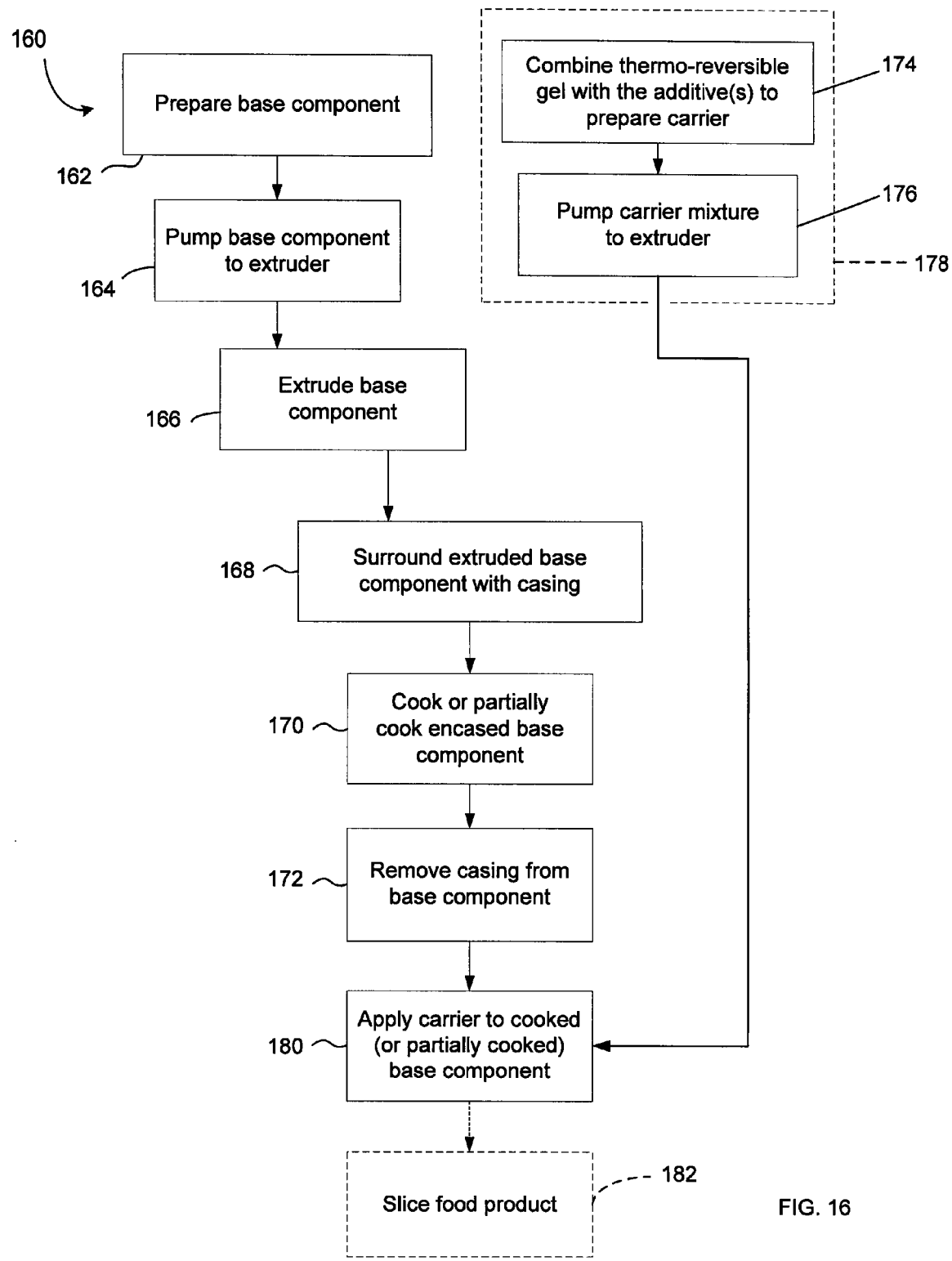

FIGS. 15 and 16 show flow diagrams of exemplary methods 130, 160 for forming the food product 100 of FIG. 13.

Referring to FIG. 15, the process 130 is shown to include preparing the base component 102 (e.g., mixing ingredients to provide the meat) (step 132). The process 130 is further shown to include pumping the base component 102 to the co-extruder system 112 (step 134). The process 130 further includes preparing the carrier 104 (e.g., combining the thermo-reversible gel with the additive(s)) (step 136), and pumping the carrier 104 to the co-extruder system 112 (step 138) in a heated environment or equipment (shown as 140). The process 130 further includes co-extruding the base component 102 and the carrier 104 (steps 142). The process 130 further includes surrounding the co-extruded base component 102 and carrier 104 with a casing 110 (step 144). The process 130 further includes cooking (or partially cooking) the encased food product 100 (step 146). The process 130 further includes removing the casing 110 from the food product 100 (step 148). The process 130 may further include slicing the cooked (or partially cooked) food product (step 150) or other post process steps.

Referring to FIG. 16, the process 160 is shown to include preparing the base component 102 (step 162), pumping the base component to the extruder (step 164), and extruding the base component (step 166). The process 160 further includes surrounding the extruded base component 102 with a casing 110 (step 168). The process 160 further includes cooking (or partially cooking) the encased base component 102 (step 170). The process 160 further includes removing the casing from the cooked (or partially cooked) base component 102 (step 172). The process 160 further includes preparing the carrier 104 (e.g., combining the thermo-reversible gel with the additive(s)) (step 174), and pumping the carrier 104 to an extruder (step 176) in a heated environment or equipment (shown as 178). The process 160 further includes applying the carrier 104 to the cooked (or partially cooked) base component 102 (step 180). The process 160 may further include slicing the cooked (or partially cooked) food product (step 182) or other post process steps. According to alternative embodiments, other processes or sequences of the process discussed herein may be used depending on the configuration and arrangement of the final food product.

The embodiment used for a particular application will depend on the type of taste, texture, and food product size that is desired. For example, for a food product having a cross-sectional dimension (e.g., diameter) of less than two inches, the solidified collagen layer is typically sufficient to provide the carrying casing to contain the main components or layers through further processing and even consumption (if desired). For larger diameter food products (e.g., lunchmeat "logs"), the solidified collagen may not have sufficient strength to contain the interior components or masses. An additional casing (e.g., plastic or fibrous materials or the like) may be provided to contain and hold the interior components. Even in such larger food products, which use the plastic/fibrous casings, the carrier layer (e.g., collagen, thermally reversible coating) may be used to supply or carry the desired additives.

It is important to note that the construction and arrangement of the elements of the system and method for forming food product as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. For example, for purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components. Accordingly, all such modifications are intended to be included within the scope of the present invention as defined in the appended embodiments. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A food product comprising:
   a first extruded protein-based component;
   a second extruded component extruded adjacent the first extruded protein-based component in a portion of the food product to include discrete portions of the second extruded component encapsulated completely by the first extruded protein-based component;
   a first extruded collagen layer substantially surrounding the first extruded protein-based component and the second extruded component;
   wherein the second extruded component comprises a vegetable, fruit, dairy, starch, secondary protein, or combinations thereof, the first extruded protein-based component and the second extruded component being maintained as distinct components.

2. The food product of claim 1 further comprising a second extruded collagen gel layer surrounding the first extruded protein-based component, the second extruded component, and the first extruded collagen layer.

3. The food product of claim 2 wherein the first extruded collagen layer comprises a flavoring, a coloring, or combinations thereof.

4. The food product of claim 3 wherein the second extruded collagen layer comprises a particulate ingredient, a coloring, or combinations thereof.

5. The food product of claim 1 wherein the first extruded protein-based component comprises meat, soy, or other protein based food component.

6. A food product comprising:
   a first extruded component;
   a second extruded component extruded adjacent to the first extruded component in a portion of the food product to include discrete portions of the second extruded component encapsulated completely by the first extruded component;
   a first collagen gel layer surrounding the first extruded component and the second extruded component, wherein the first collagen gel layer comprises a matrix and a first additive, the matrix being a thermo-reversible coating that suspends the first additive and adheres to the first extruded component;
   a second collagen gel layer substantially surrounding the first collagen gel layer;
   wherein the second collagen gel layer comprises a second additive; and
   wherein the first extruded component and the second extruded component are maintained as distinct components.

7. The food product of claim 6 wherein the first additive comprises a flavoring, a coloring, or combinations thereof.

8. The food product of claim 6 wherein the second additive comprises a particulate ingredient, a coloring, or combinations thereof.

9. The food product of claim 6 wherein the first additive comprises a flavoring, a coloring, or combinations thereof and the second additive comprises a particulate ingredient, a coloring, or combinations thereof.

10. The food product of claim 6, wherein the first extruded component comprises meat, soy, or other protein based food component, and wherein the second extruded component comprises a vegetable, fruit, dairy, or combinations thereof.

11. A process for making a food product, the process comprising:
    extruding a first protein-based food component;
    co-extruding a second food component adjacent the first protein-based food component in a portion of the food product to include discrete portions of the second food component encapsulated completely by the first protein-based food component; and
    co-extruding a first collagen layer substantially surrounding the first protein-based food component and the second food component to form a casing,
    wherein the second food component comprises a vegetable, fruit, dairy, starch, secondary protein, or combinations thereof, the first protein-based food component and the second food component being maintained as distinct components.

12. The process of claim 11 further comprising co-extruding a second collagen gel with the first food component, the second food component, and the first collagen gel, wherein the first collagen gel forms an inner casing substantially surrounding the meat component, and wherein the second collagen gel forms an outer casing substantially surrounding the meat component and the first casing.

13. The process of claim 11 wherein the first collagen gel comprises a first additive comprising a flavoring, a coloring, or combinations thereof.

14. The process of claim 11 wherein the second collagen gel comprises a second additive comprising a particulate ingredient, a coloring, or combinations thereof.

15. The process of claim 11 wherein the first component comprises a meat, soy, or other protein base.

16. The process of claim 11 wherein the second food component includes non-meat component comprising a vegetable, fruit, dairy, or combinations thereof.

17. A process for making a food product, the process comprising:
    providing a first collagen gel having a first additive and a matrix, the matrix being a thermo-reversible coating that suspends the first additive;
    providing a second collagen gel having a second additive;
    co-extruding a first component, a second component, the first collagen gel, and the second collagen gel, the second component being extruded adjacent to the first component in a portion of the food product to include discrete portions of the second component encapsulated completely by the first component;
    wherein the first collagen gel forms an inner casing substantially surrounding the first component and the second component and adheres to the first component;
    wherein the second collagen gel forms an outer casing substantially surrounding the first component, the second component and the first collagen gel; and
    wherein the first component and the second component are maintained as distinct components.

18. The process of claim 17 wherein the first additive and the second additive are selected from the group comprising a flavoring, a coloring, a particulate ingredient, a coloring, or combinations thereof.

19. The process of claim 17 wherein the first component comprises a meat.

20. The process of claim 17 further comprising extruding a second food component with the first component, the first collagen gel, and the second collagen gel.

21. The process of claim 17 wherein the second component is a non-meat component comprising a vegetable, fruit, dairy, or combinations thereof.

22. A food product comprising:
a first extruded meat-based component;
a second extruded meat-based component adjacent to the first extruded meat-based component in a portion of the food product to include discrete portions of the second extruded meat-based component encapsulated completely by the first extruded meat-based component, the first extruded meat-based component and the second extruded meat-based component being maintained as distinct layers;
a carrier extruded with the first and second extruded meat-based components, the carrier comprising a matrix adhered to the first extruded meat-based component and an additive suspended in the matrix, the matrix being a thermo-reversible coating.

23. The food product of claim 22 wherein the additive comprises a flavoring, spice, coloring, anti-microbial, probiotic, texture, or combinations thereof.

24. A process for making a food product, the process comprising:
providing a first meat-based food component and a second meat-based food component to a co-extrusion system;
providing a carrier to a co-extrusion system, the carrier comprising a thermo-reversible matrix suspending an additive in the matrix;
extruding the first meat-based food component and the second meat-based food component, the second meat-based component being extruded adjacent the first meat-based food component in a portion of the food product to include discrete portions of the second meat-based extruded component encapsulated completely by the first extruded meat-based component; and
extruding the carrier adjacent the first food component, the carrier adhering to the first extruded meat-based component.

25. The process of claim 24 further comprising surrounding the co-extruded first food component and carrier with a casing.

26. The process of claim 25 further comprising at least partially cooking the encased food product.

27. The process of claim 26 further comprising removing the casing and slicing the food product.

28. The process of claim 24 further comprising surrounding the extruded first food component with a casing and cooking the encased first food component before co-extruding with the carrier.

29. The food product of claim 1, wherein the second extruded component further comprises, a flavoring, spice, coloring, particulate, or combinations thereof.

30. The food product of claim 6, wherein the matrix comprises at least one of a carbohydrate base and a protein base.

31. The food product of claim 6, wherein the first extruded collagen gel layer adheres to the first extruded component rather than to the second extruded collagen gel layer.

32. The food product of claim 22, wherein the matrix comprises at least one of a carbohydrate base and a protein base.

33. The food product of claim 22, further comprising a collagen layer substantially surrounding the carrier, wherein the carrier does not adhere to the collagen layer.

\* \* \* \* \*